(12) United States Patent
Mocioiu et al.

(10) Patent No.: US 11,588,866 B2
(45) Date of Patent: *Feb. 21, 2023

(54) DELIVERING TAILORED AUDIO SEGMENTS WITHIN LIVE AUDIO STREAMS

(71) Applicant: AdsWizz Inc., San Mateo, CA (US)

(72) Inventors: Victor Mocioiu, Bucharest (RO); Bruno Nieuwenhuys, Sunnyvale, CA (US); Vlad Andrei Dumitru, Bucharest (RO); Florin Guzik, Bucharest (RO)

(73) Assignee: AdsWizz Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,749

(22) Filed: Nov. 10, 2020

(65) Prior Publication Data

US 2021/0067574 A1 Mar. 4, 2021

Related U.S. Application Data

(63) Continuation of application No. 15/998,876, filed on Aug. 16, 2018, now Pat. No. 10,868,846.

(30) Foreign Application Priority Data

Aug. 16, 2017 (EP) ..................... 17464010

(51) Int. Cl.
*H04L 65/60* (2022.01)
*G06F 3/16* (2006.01)
(Continued)

(52) U.S. Cl.
CPC .............. *H04L 65/60* (2013.01); *G06F 3/165* (2013.01); *G06F 3/167* (2013.01); *H04L 65/612* (2022.05);
(Continued)

(58) Field of Classification Search
CPC ... H04L 65/60; H04L 65/4084; H04L 65/604; H04L 67/22; H04L 67/306; G06F 3/165; G06F 3/167
See application file for complete search history.

(56) References Cited

U.S. PATENT DOCUMENTS 8,566,152 B1* 10/2013 Shaw ..................... G06Q 30/02
705/14.1
8,595,071 B2* 11/2013 Veach ................ G06Q 30/0244
705/14.73

(Continued)

OTHER PUBLICATIONS

United States Office Action, U.S. Appl. No. 15/998,876, dated Feb. 4, 2020, 11 pages.

*Primary Examiner* — Patrice L Winder
(74) *Attorney, Agent, or Firm* — Fenwick & West LLP (57) ABSTRACT

An online system tailors audio segments for users accessing a live audio stream such that the audio segments can be presented to users during a break of the live audio stream. The audio segment can include interactive content as well as one or both of an audio clip and a standard message, each of which serves as a type of introduction to the interactive content. For each user, the online system analyzes characteristics of the user to determine whether to include the standard message in addition to the audio clip, or to withhold the standard message from the audio segment. Therefore, different users accessing the live audio stream can be appropriately introduced to the interactive content which can improve the likelihood that the users interact with the interactive content.

20 Claims, 4 Drawing Sheets (51) Int. Cl.
   *H04L 67/306* (2022.01)
   *H04L 65/612* (2022.01)
   *H04L 65/75* (2022.01)
   *H04L 67/50* (2022.01)

(52) U.S. Cl.
   CPC .......... *H04L 65/764* (2022.05); *H04L 67/306* (2013.01); *H04L 67/535* (2022.05)

(56) References Cited

U.S. PATENT DOCUMENTS

| | | | |
|---|---|---|---|
| 8,887,040 B2 | 11/2014 | Ray et al. | |
| 10,099,140 B2 | 10/2018 | Lynch et al. | |
| 10,187,440 B2 | 1/2019 | Naik et al. | |
| 10,943,255 B1 * | 3/2021 | Andreou | G06Q 30/0244 |
| 11,012,390 B1 * | 5/2021 | Al Majid | H04L 51/10 |
| 2013/0254329 A1 * | 9/2013 | Lin | H04L 29/08072 709/217 |
| 2014/0180815 A1 * | 6/2014 | Chatwin | G06Q 30/0256 705/14.54 |
| 2014/0280214 A1 * | 9/2014 | Han | G06F 16/24575 707/748 |
| 2015/0269627 A1 | 9/2015 | Urdiales Delgado et al. | |
| 2015/0279227 A1 * | 10/2015 | Huber | G09B 7/06 434/353 |
| 2016/0127304 A1 * | 5/2016 | Reilly | H04L 67/325 709/206 |
| 2016/0189222 A1 | 6/2016 | Richman et al. | |
| 2016/0267520 A1 * | 9/2016 | Kalish | G06Q 30/0242 |
| 2017/0103754 A1 | 4/2017 | Higbie et al. | |
| 2017/0195745 A1 * | 7/2017 | Kumar Bvn | H04N 21/2387 |
| 2018/0130092 A1 * | 5/2018 | Nahass | H04L 67/535 |
| 2018/0190275 A1 * | 7/2018 | Bhaya | H04L 65/1069 |
| 2018/0268435 A1 * | 9/2018 | Lee | G06Q 30/0241 |
| 2019/0324602 A1 * | 10/2019 | Rao | H04L 67/535 |

* cited by examiner

Select content to be presented at a break within a live audio stream to one or more users accessing the live audio stream
305

Identify a type of the selected content
310

For each of the one or more users accessing the audio stream, determine whether to include a standard message in conjunction with the selected content for the user
315

Based on the determination, assembling audio segments that each include at least an audio clip and the selected content
320

Provide the assembled audio segments to be presented at the break within the live audio stream
325

DELIVERING TAILORED AUDIO SEGMENTS WITHIN LIVE AUDIO STREAMS

CROSS REFERENCE TO RELATED APPLICATIONS

This application is a continuation of application Ser. No. 15/998,876 filed Aug. 16, 2018, which is incorporated by reference in its entirety.

BACKGROUND

The present disclosure generally relates to distribution of streaming content, and more specifically, relates to methods for delivering different audio segments within live audio streams to different users that are accessing live audio streams.

Audio consumption of online digital streams have increased, especially with the advent of voice-enabled devices such as smart devices. Content providers aim to deliver content within digital streams that maximize awareness and/or other key performance indicators. Conventional audio-based content presented within digital streams may not generate large and consistent responses from users that access the digital streams. For example, audio-content based content are often similarly structured (e.g., background music layered with some additional audio elements) and therefore, users may not pay attention to particular audio segments within digital streams.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Configuration Overview

An online system collaborates with a stream provider server to provide audio segments at breaks within live audio streams to users that are accessing the live audio streams. Generally, users of client devices access a live audio stream that is provided by the stream provider server. As the live audio stream is ongoing, the stream provider server identifies an upcoming break (e.g., a commercial break) in the live audio stream where the users accessing the live audio stream are to be served audio segments. The stream provider server notifies the online system, which can assemble the audio segment and further provide the assembled audio segment to users of client devices to be played at the identified break within the live audio stream.

In various embodiments, the online system assembles audio segments that are tailored for each user that is accessing the live audio stream. Generally, assembled audio segments include different audio elements, examples of which include interactive or non-interactive content and/or notifications that serve to introduce the interactive or non-interactive content. Examples of notifications can be a short audio cue, hereafter referred to as an audio clip, or a long audio cue, hereafter referred to as a standard message. An audio clip can be a distinctive sound that can cause a fast recall in users that hear the audio clip. As an example, an audio clip can be a jingle with a duration of several seconds (e.g., 1, 2, or 3 seconds). A standard message can be longer in duration than an audio clip, and can include a verbal message that vocally identifies a user action that can be performed by a user to interact with the interactive content. As an example, a standard message can state "The following content item is an audio interactive content item. Interact with the interactive content item by shaking your phone!" The inclusion of one or both of the standardized message and the audio clip in an assembled audio segment enables a user that consumes the assembled audio segment to be drawn to the fact that an 'unusual' type of interactive content is going to follow, and that the user can perform an interaction in relation to the interactive content.

In some embodiments, the online system assembles audio segments for one or more users that includes interactive content and both the audio clip and the standard message. In some embodiments, the online system assembles audio segments for one or more users that includes interactive content and the audio clip but not the standard message. For each user accessing the live audio stream, the online system can perform logic to determine whether to include the standard message in the assembled audio segment. This is beneficial because some users may be well versed in responding to an interactive content after merely being presented the audio clip and need not be presented the standard message. Conversely, some users may not be well versed and therefore, may need both the audio clip and the standard message to be effectively prompted to respond to the interactive content.

Altogether, the online system can tailor the inclusion of particular audio elements in the assembled audio segment for each user to ensure that the user is appropriately notified of content in the assembled audio segment without significantly compromising the user's listening experience. This improves the likelihood that the user interacts with the interactive content that is presented within the live audio stream.

System Environment

Figure 1:
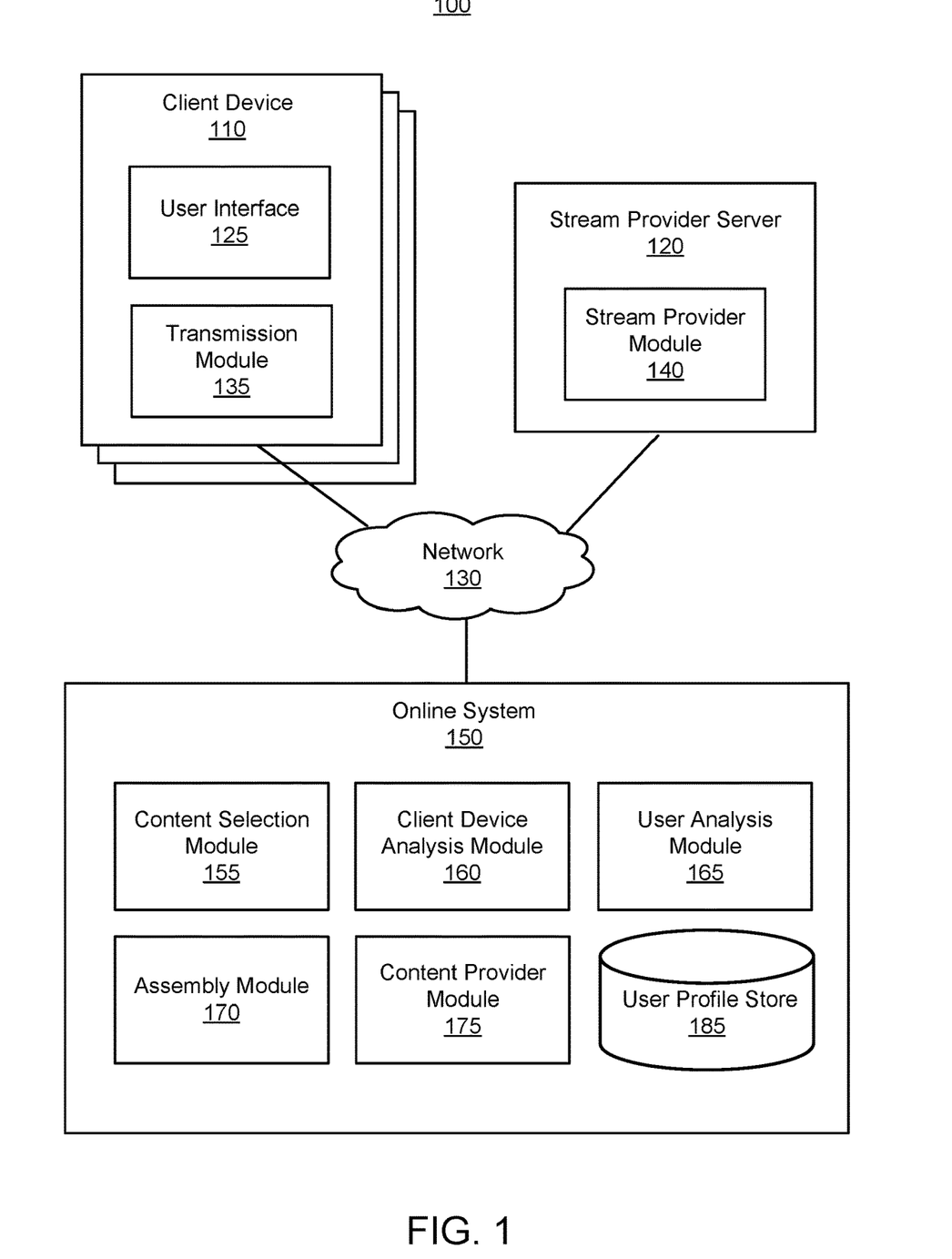
FIG. 1 illustrates an overall system environment for delivering assembled audio segments within audio streams, in accordance with an embodiment.

Referring to FIG. (FIG. 1, it illustrates an overall system environment 100 for delivering assembled audio segments within audio streams, in accordance with an embodiment. In particular, the system environment 100 can include one or more client devices 110, a stream provider server 120, and an online system 150, each of which are interconnected through a network 130. FIG. 1 depicts three client devices 110 and one stream provider server 120 in the system environment 100. In various embodiments, the environment 100 may include fewer or more client devices 110 and/or stream provider servers 120 than shown in FIG. 1. For example, the online system 150 may communicate with millions of client devices 110 through the network 130. In various embodiments, the stream provider server 120 and the online system 150 are embodied within a single system in the system environment 100.

Client Device

The client device 110 is an electronic device, examples of which include a personal computer (PC), a desktop computer, a laptop computer, a notebook, or a tablet PC executing an operating system, for example, a Microsoft Windows-compatible operating system (OS), Apple OS X, and/or a Linux distribution. In various embodiments, the client device 110 can be any device having computer functionality, such as a personal digital assistant (PDA), mobile telephone, smartphone, etc. In particular embodiments, the client device 110 can be a smart device, examples of which include a Smartwatch or a smart home device (e.g., GOOGLE HOME, AMAZON ECHO, APPLE HOMEPOD, and the like). Such a smart device can include an audio output component and an audio input component. The client device 110 may execute instructions (e.g., computer code) stored on a computer-readable storage medium. In some embodiments, a client device 110 may include one or more executable applications, such as a web browser, to interact with services and/or content provided by the stream provider server 120 and/or the online system 150. In some embodiments, the executable application may be a particular application designed by the online system 150 or the stream provider server 120 and locally installed on the client device 110. As shown in FIG. 1, a client device 110 can include a user interface 125 and a transmission module 135.

The user interface 125 on the client device 110 may present content to a user of the client device 110. For example, the user interface 125 may be a display that presents content such as a live stream (audio or video) or a content item (e.g., an advertisement) to a user of the client device 110. As another example, the user interface 125 may be speakers that project audio content (e.g., a live audio stream) to the surrounding environment for consumption by a user of the client device 110. As yet another example, the user interface 125 can refer to sensors of the client device 110 such as a gyroscope and/or accelerometer that detects user actions. The user interface 125 can further detect a variety of inputs, such as user actions, performed by a user of the client device 110. In one embodiment, the user interface 125 receives an action from the user to join a live audio or live video stream that is provided by the stream provider server 120. In some embodiments, the user interface 125 receives user actions from the user in response to the presentation of a content, such as an assembled audio segment. Example user actions provided by a user can be physical inputs (e.g., a user can provide a touch input through a display of the client device 110) or can be vocal inputs (e.g., a voice input that is captured by the client device 110). Other types of user actions may include an interaction (e.g., a click) with a presented content item or a changing of the volume. As another example, user actions can include a changing orientation of the client device 110 (e.g., facedown placement, raising of the client device 110) or a shaking of the client device 110.

The transmission module 135 transmits information to the stream provider server 120 and/or the online system 150. For example, the transmission module 135 can transmit information pertaining to when a user of the client device 110 joins the live stream. Additionally or alternatively, the transmission module 135 can transmit identifying information of either the user or the client device 110 used by the user. As an example, identifying information can include an internet protocol (IP) address of the client device 110, a user identifier, a device type, a device identifier, and the like. In various embodiments, such identifying information can be accessed by an application installed on the client device 110. In some embodiments, identifying information can be transmitted in conjunction with the information pertaining to when a user of the client device 110 joins the live stream. In various embodiments, the transmission module 135 may further transmit the user actions detected by the user interface 125.

Network

The network 130 facilitates communications between the client devices 110, stream provider server 120, and online system 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

Stream Provider Server

The stream provider server 120 can provide content to the one or more client devices 110 to be presented to a user of the client device 110. As one example, the content may be a live stream that includes audio or video information. In various embodiments, the content is an assembled audio segment that is provided by the online system 150. The assembled audio segment may include sponsored content that includes an audio file, video file, image, and the like.

The stream provider server 120 includes a stream provider module 140 to perform the steps described hereafter. Generally, the stream provider module 140 provides one of a live audio stream or a live video stream to a client device 110. During the live stream, a break (e.g., a commercial break) may occur. At the break, the stream provider module 140 provides an assembled audio segment to one or more client devices 110 that are accessing the live stream. The assembled audio segment includes interactive content (e.g., an advertisement) or a non-interactive content (e.g., a public service announcement, or an informational announcement, e.g., a game score, an update, a notification).

In various embodiments, the stream provider module 140 provides a request to the online system 150 requesting for assembled audio segments that can be provided to client devices 110 during a break in live streams. Generally, the request sent by the stream provider module 140 includes identifying information of either or both of the user or the client device 110 used by the user that is accessing the live stream. As an example, the stream provider module 140 includes a device identifier of the client device 110. As another example, the stream provider module 140 includes a user identifier of the user.

The stream provider module 140 may provide a request to the online system 150 for an assembled audio segment in response to a trigger event. In one embodiment, a trigger event refers to when a client device 110 accesses the live stream. For example, when a client device 110 accesses a live stream, the stream provider module 140 can send a request to the online system 150 indicating that a client device 110 has accessed the live stream. In some embodiments, a trigger event refers to when the stream provider module 140 identifies an upcoming break in the live stream. In one embodiment, the stream provider module 140 may identify an upcoming break in the live stream in response to a manual indication of the upcoming break from a curator of the live stream (e.g., a stream curator). In some embodiments, the stream provider module 140 identifies an upcoming break based on an amount of time that has elapsed since a prior break in the live stream. For example, if the last break in the live stream occurred over a threshold amount of time ago, then the stream provider module 140 may automatically set an upcoming break in the live stream at a particular time in the future. Altogether, by sending a request for assembled audio segments in response to a trigger event, the stream provider module 140 can request for and receive assembled audio segments to be provided to a client device 110 in advance of an upcoming break in the live stream.

Online System

The online system 150 assembles audio segments to be presented to users at breaks within live audio streams. Generally, the online system 150 generates assembled audio segments that includes different audio elements, examples of which include content selected for users and one or both of an audio clip and a standard message that serve to introduce users to the selected content. The online system 150 may analyze each user to determine whether to include one or both of the audio clip and the standard message in the assembled audio segment for the user. Thus, the online system 150 generates assembled audio segments that can be provided to client devices 110 to be presented during breaks in live audio streams. As shown in FIG. 1, the online system 150 includes a content selection module 155, a client device analysis module 160, a user analysis module 165, an assembly module 170, a content provider module 175, and a user profile store 185.

Referring first to the content selection module 155, the content selection module 155 receives requests from the stream provider server 120 and selects content for one or more users that are accessing the live audio stream. In various embodiments, the content selection module 155 accesses the user profile store 185 for characteristics of the user. To identify the correct user whose characteristics are stored in the user profile store 185, the content selection module 155 extracts a user identifier included in the request from the stream provider module 140. Using the extracted user identifier, the content selection accesses the user characteristics in the user profile store 185 that are associated with the extracted user identifier. Therefore, the content selection module 155 can select content for the user using the accessed characteristics of the user.

Generally, characteristics of a user accessed from the user profile store 185 can include prior interactions performed by the user, prior content items (e.g., interactive or non-interactive content items) that have been provided for presentation to the user, personal information of the user (e.g., name, geographical location, ethnicity, demographic group, and the like), characteristics of the device that the user is accessing (e.g., volume level of the device, power status of the device, and the like), and/or characteristics associated with voice recordings provided by the user (e.g., volume level, ambient noise level, tone, pitch, speech cadence, words spoken per minute, and the actual speech recording). Therefore, based on the characteristics of the user, the content selection module 155 can select a content that the user is likely to respond to. For example, if the user previously exhibited a high rate of interaction in response to being presented a prior content item, thereby demonstrating interest in the prior content item, then the content selection module 155 can select a content item that shares a topic with the prior content item as the user is likely to perform an interaction in relation to the selected content item as well. As another example, if the user is based in a particular geographical location, the content selection module 155 can select a public service announcement that is relevant for users that reside in the geographical location.

The content selection module 155 further determines a type of the selected content. As an example, the content selection module 155 may determine that a selected content is one of an interactive content or a non-interactive content. Generally, an interactive content refers to a content item that a user can perform a user action in order to cause a subsequent action to occur. As an example, an interactive content can be an advertisement. Therefore, if the user performs a particular user action in relation to the advertisement, then a subsequent action can occur (e.g., the user can be provided a coupon or be redirected to a particular website associated with the advertisement). A non-interactive content refers to a content item that a user need not perform a user action with. As an example, non-interactive content can include a public service announcement or an informational announcement (e.g., a game score, an update, a notification).

If the content selection module 155 determines that the selected content is an interactive content, the content selection module 155 provides the selected content to the client device analysis module 160. Alternatively, if the content selection module 155 determines that the selected content is a non-interactive content, the content selection module 155 directly provides the non-interactive content to the assembly module 170 for assembling an audio segment. The assembly of an audio segment is described in further detail below.

The client device analysis module 160 analyzes a type of a client device 110 that is accessing a live stream and assigns a type of interaction to the interactive content selected by the content selection module 155. Generally, the client device analysis module 160 identifies a type of the client device 110 using the device identifier that is included in the request provided by the stream provider module 140. For example, the client device analysis module 160 can identify that the client device 110 is one of a computer, a cell phone, a smart device, and the like given the device identifier. By identifying the type of the client device 110, the client device analysis module 160 determines the capabilities of the client device 110 and further identifies an appropriate interaction for an interactive content based on the capabilities of the client device 110. An interaction refers to a user action performed by the user in relation to a client device 110. Examples of interactions include performing physical interactions with a client device (e.g., shaking of a client device 110, orienting a client device 110 e.g., flipping, placing face down, rotating, interaction with the user interface 125 of the client device 110, etc.), interacting with a display of the client device 110, providing vocal input to a client device 110, taking a photo using the client device 110, and changing settings (e.g., volume, brightness of screen, etc.) of the client device 110. As another example, an interaction may be based on a determination of geographical location of the user and/or other users that are near the user. Such an interaction may request that the user perform an action (e.g., send a message, take a photo) with one of the geographically proximal users.

By considering the capabilities of the client device 110, the client device analysis module 160 ensures that an interaction to be performed in relation to the client device 110 can be performed by a user of the client device 110. As an example, if the client device analysis module 160 determines that a client device 110 is a cellular device, then the client device analysis module 160 can select an interaction that a user can perform in relation to the cellular device (e.g., shaking/orienting the cellular device, interacting with a display of the cellular device, etc.). As another example, if the client device analysis module 160 determines that a client device 110 is a smart home device that a user would not be holding, then the client device analysis module 160 can select an interaction that a user can perform in relation to the smart home device (e.g., providing vocal input to the smart home device). The client device analysis module 160 provides the selected interaction in conjunction with the selected interactive content to the assembly module 170 for further analysis.

The user analysis module 165 analyzes characteristics of the user of the client device 110 that is accessing a live stream and determines the audio elements that are to be included in the audio segment. The user analysis module 165 can access characteristics of a user from the user profile store 185 by using the user identifier included in the request received from the stream provider module 140. Therefore, the user analysis module 165 can determine whether to include one or both of an interactive audio clip and standard message based on the analysis of the user's characteristics accessed from the user profile store 185.

In various embodiments, the user analysis module 165 analyzes characteristics of the user to determine whether the user satisfies a user interaction criterion. The user interaction criterion may be related to prior interactions performed by the user in relation to prior interactive content presented to the user (e.g., prior interactive content presented to the user in a previously accessed live audio stream). In one embodiment, the user interaction criterion may refer to a threshold number of interactions performed by the user in relation to prior interactive content. In some embodiments, the user interaction criterion may refer to a threshold number of interactions performed by the user in relation to prior interactive content within a threshold amount of time.

If the user analysis module 165 determines that the characteristics of the user do not satisfy the user interaction criterion, the user analysis module 165 decides that an assembled audio segment for the user is to include both a standard message and an audio clip. The user analysis module 165 can provide an indication that both the standard message and the audio clip are to be included within an assembled audio segment to the assembly module 170.

If the user analysis module 165 determines that the characteristics of the user satisfy the user interaction criterion, the user analysis module 165 performs subsequent analysis to determine whether one or both of the standard message and audio clip are to be included in the assembled audio segment for the user. In various embodiments, the subsequent analysis performed by the user analysis module 165 includes generating an interaction score for the user based on the characteristics of the user. A user's interaction score represents a user's level of interactivity with prior content.

In one embodiment, the interaction score for a user can be computed as shown below in Equation 1. If a user has previously performed N different interactions and has subsequently been presented M different content items after the user has performed the N different interactions, then the interaction score for the user is computed using the following formula:

$$\text{Interaction Score} = N/M \tag{1}$$

In various embodiments, the interaction score represents a likelihood that the user would interact with an interactive content item when solely presented with an audio clip without being presented a standard message. Here, the user analysis module 165 may calculate a user's interaction score by applying a machine learning model. In various embodiments, the machine learning model can be any one of a decision tree, ensemble (e.g., bagging, boosting, random forest), linear regression, Naïve Bayes, support vector, logistic regression, or neural network. The machine learning model may have learned parameters that can be adjusted during training. In various embodiments, each machine learning model may be specific for a type of interaction of an interactive content. For example, a first machine learning model can be applied for interactive content that a user interacts with through physical interactions with a client device whereas a second machine learning model can be applied for interactive content that a user interacts with through vocal input to a client device.

The machine learning model may be structured to receive, as input, one or more input feature values and is further structured to output the interaction score for the user. Input features can include characteristics of the user such as characteristics of the device that the user is accessing (e.g., volume level of the device, power status of the device, and the like) and/or characteristics associated with voice recordings provided by the user such as a volume level of the user's voice, ambient noise level, average tone or changes in tone in the user's voice, average or changes in pitch, speech cadence, words spoken per minute, and/or the actual speech recording. Further input features may include characteristics of an audio clip, such as the likely difficulty in understanding the audio clip, which can be dependent on grammatical quality and/or word selection.

Each machine learning model may be trained based on training data that includes user characteristics from numerous training users. In various embodiments, training data represents empirical data gathered from previous training users. For example, different training users can be provided different audio clips without a corresponding standard message and values of input features can be derived for each training user. For each audio clip, values of input features corresponding to a training user are provided to the machine learning model to obtain a predicted interaction score for the training user. The predicted interaction score is compared to an output label, which may include manually labeled output. As an example, a manually labeled output can be provided by the training user that indicates whether the training user comprehended what interaction to perform in response to hearing the audio clip without the corresponding standard message. Based on the comparison between the predicted interaction score and the output label, the machine learning model is trained to more accurately predict interaction scores that indicate whether a user would understand an audio clip without the standard message.

The user analysis module 165 determines whether to include a standard message in an assembled audio segment for a user by comparing the user's interaction score to a threshold interaction score. In one embodiment, if the interaction score for a user is greater or equal to a threshold interaction score, then the user analysis module 165 decides that an interactive audio clip is to be included in an assembled audio segment for the user but a standard message is to be withheld from the assembled audio segment. Conversely, if the interaction threshold value calculated in Equation 1 is less than a threshold interaction score, then the user analysis module 165 decides that both an interactive audio clip and a standard message are to be included in an assembled audio segment for the user. In various embodiments, the interaction threshold value is a value of 1, though in other embodiments, other values for the interaction threshold value can be set. The user analysis module 165 provides the selected content and indications of one or both of the standard message and the audio clip to the assembly module 170.

The assembly module 170 assembles audio segments that includes the audio elements such as the selected content (e.g., selected by the content selection module 155), a standard message, and/or an audio clip. Based on the analysis conducted by the user analysis module 165, the assembly module 170 selects the particular audio elements (e.g., audio clip and/or the standard message) and generates an audio segment by concatenating the different audio elements in a particular order. Generally, the assembled audio segment includes the selected content and an audio clip. The audio clip precedes the selected content such that a user that consumes the assembled audio segment would be first presented the audio clip and subsequently presented the selected content. Thus, the audio clip would serve to introduce the user to the selected content.

In various embodiments, the assembly module 170 selects an audio clip to be included with the selected content based on the type (e.g., interactive or non-interactive) of selected content. For example, if the selected content is an interactive content, the assembly module 170 selects a first type of audio clip, hereafter referred to as an interactive audio clip. Alternatively, the assembly module 170 selects a second type of audio clip, hereafter referred to as a non-interactive audio clip, if the selected content is a non-interactive content. Generally, an interactive audio clip selected for an interactive content can be aurally distinguishable from a non-interactive audio clip selected for a non-interactive content. In various embodiments, when selecting a particular interactive audio clip, the assembly module 170 further considers the type of interaction for the selected content that was determined by the client device analysis module 160. For example, the assembly module 170 selects a different interactive audio clip for each different interaction determined by the client device analysis module 160. This may be beneficial as a user that is presented the specific interactive audio clip can readily distinguish the user action that the user can perform in relation to the interactive content.

In some embodiments, based on the analysis conducted by the user analysis module 165, the assembly module 170 further includes the standard message in the assembled audio segment for a user. The standard message can precede the selected content such that the standard message can additionally serve to introduce a user to the subsequent selected content. In various embodiments, the standard message further precedes the audio clip. In other embodiments, the audio clip precedes the standard message. Together, the standard message and the audio clip that both precede the selected content can serve to introduce a user to the subsequent selected content. The assembly module 170 provides the assembled audio segment to the content provider module 175.

The content provider module 175 transmits the assembled audio segment to be presented to users at a break within the live stream. In various embodiments, the content provider module 175 can directly provide the assembled audio segment to client devices 110 that are accessing live audio streams provided by the stream provider server 120. The assembled audio segment can then be played by client devices 110 at a break within the live audio stream. In some embodiments, the content provider module 175 provides the assembled audio segment to the stream provider server 120 such that the stream provider server 120 can include the assembled audio segment at a break within the live audio stream.

The user profile store 185 holds characteristics of users of client devices 110 that have previously accessed live streams and/or have previously interacted with content provided by the stream provider server 120. In various embodiments, the user profile store 185 is a database that is organized according to particular users. For example, the user profile store 185 can be indexed based on user identifiers so that characteristics of a particular user are organized according to a user identifier that identifies a user.

Generally, characteristics of each user can include prior interactions performed by the user in relation to content items, prior content items (e.g., interactive or non-interactive content items) that have been provided for presentation to the user, characteristics of the device that the user is accessing (e.g., volume level of the device, power status of the device, and the like), and personal information of the user (e.g., name, geographical location, ethnicity, demographic group, and the like). Characteristics of a user can further include characteristics associated with voice recordings provided by the user such as a volume level of the user's voice, ambient noise level, average tone or changes in tone in the user's voice, average or changes in pitch, speech cadence, words spoken per minute, and/or the actual speech recording. As described above, characteristics of users can be accessed and used to select content for particular users and/or to determine the audio elements that are to be included in an audio segment for users.

Figure 2:
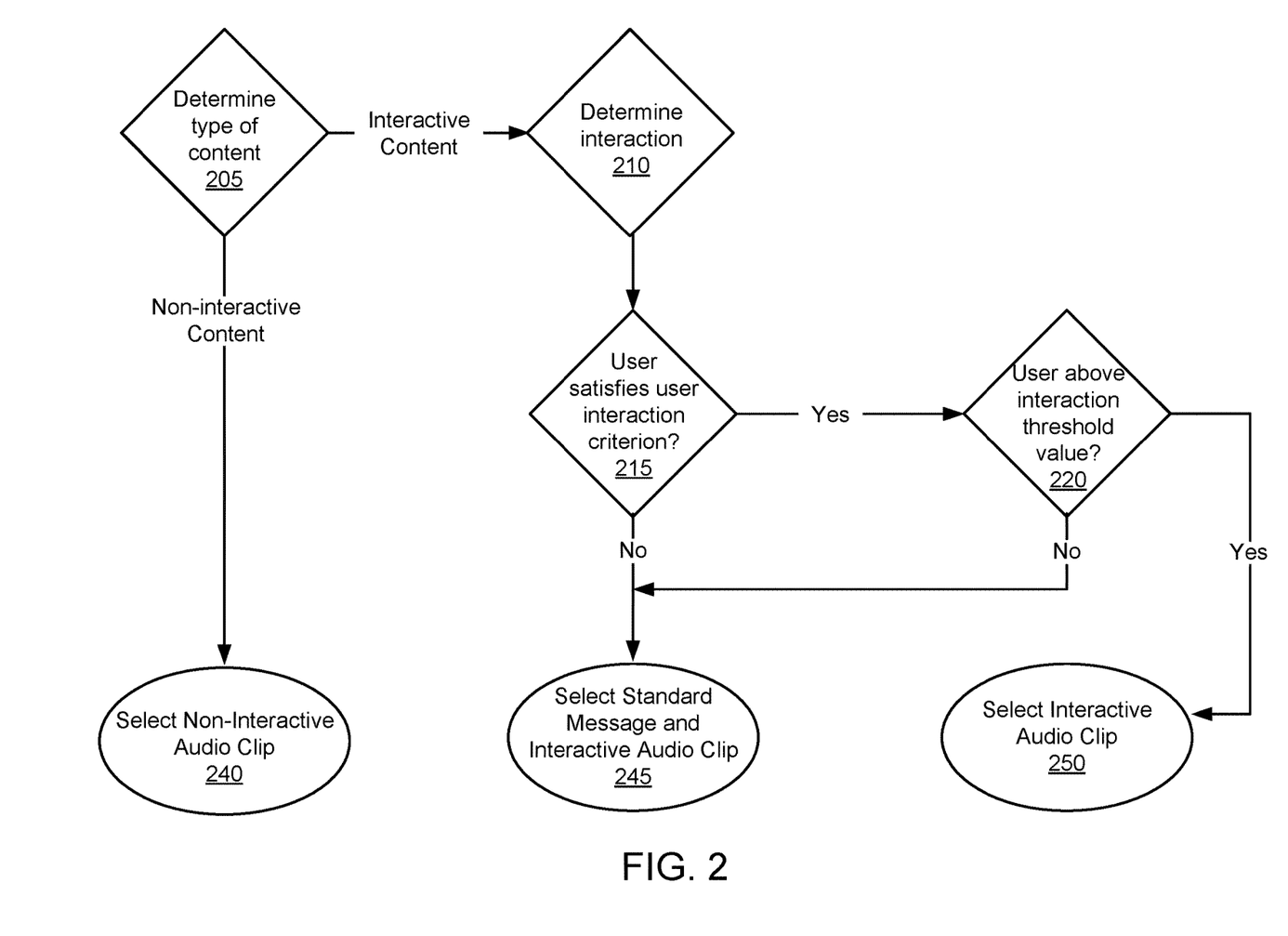
FIG. 2 illustrates a flow diagram for determining audio elements to be included in an assembled audio segment, in accordance with an embodiment.

FIG. 2 illustrates a flow diagram for determining which audio elements to be included in an assembled audio segment, in accordance with an embodiment. The decision making flow process shown in FIG. 2 is generally performed by the online system 150. At step 205, the online system 150 determines a type of a content that is selected for one or more users that are accessing a live audio stream. In some embodiments, the online system 150 determines that the content is a non-interactive content and therefore, selects 240 a non-interactive audio clip to be included in an assembled audio segment with the non-interactive content.

In some embodiments, the online system 150 determines that the content is an interactive content and performs subsequent analysis to determine whether to select or withhold a standard message. For example, at step 210, the online system determines an interaction for the interactive content. The interaction refers to a user action to be performed by a user in relation to a client device 110 when the interactive content is presented. As described above, the online system 150 can determine an appropriate interaction based on the capabilities of the client device 110 such that a user can appropriately perform the user action in relation to the client device 110.

At steps 215 and 220, the online system 150 analyzes characteristics of the user of the client device 110. Specifically, at step 215, the online system 150 determines whether the characteristics of the user satisfies a user interaction criterion that relates to prior interactions performed by the user in relation to prior interactive content. If the characteristics of the user do not satisfy the user interaction criterion, then the presentation of solely an interactive audio clip (e.g., without a standard message) may not be sufficient to introduce the user to the interactive content. In this scenario, the online system 150 selects 245 both a standard message and an interactive audio clip to be included in an assembled audio segment with the interactive content.

Alternatively, at step 215, the online system 150 may determine that the characteristics of the user satisfy the user interaction criterion. Thus, the online system 150 conducts a subsequent analysis at step 220. The online system 150 determines an interaction score for the user and compares the user's interaction score to an interaction threshold value. If the user's interaction score is below the interaction threshold value, this indicates that the presentation of solely an interactive audio clip (e.g., without a standard message) may not be sufficient to introduce the user to the interactive content. Thus, the online system 150 selects 245 both the standard message and an interactive audio clip to be included in conjunction with the interactive content. Conversely, at step 220, if the online system 150 determines that the user's interaction score is above the interaction threshold value, then the online system 150 deems that the presentation of solely an interactive audio clip (e.g., without a standard message) is likely to be sufficient to introduce the user to the interactive content. Thus, the online system 150 selects 250 the interactive audio clip but not the standard message to be included in conjunction with the interactive content.

Flow Process for Providing Audio Segments within an Audio Stream

Figure 3:
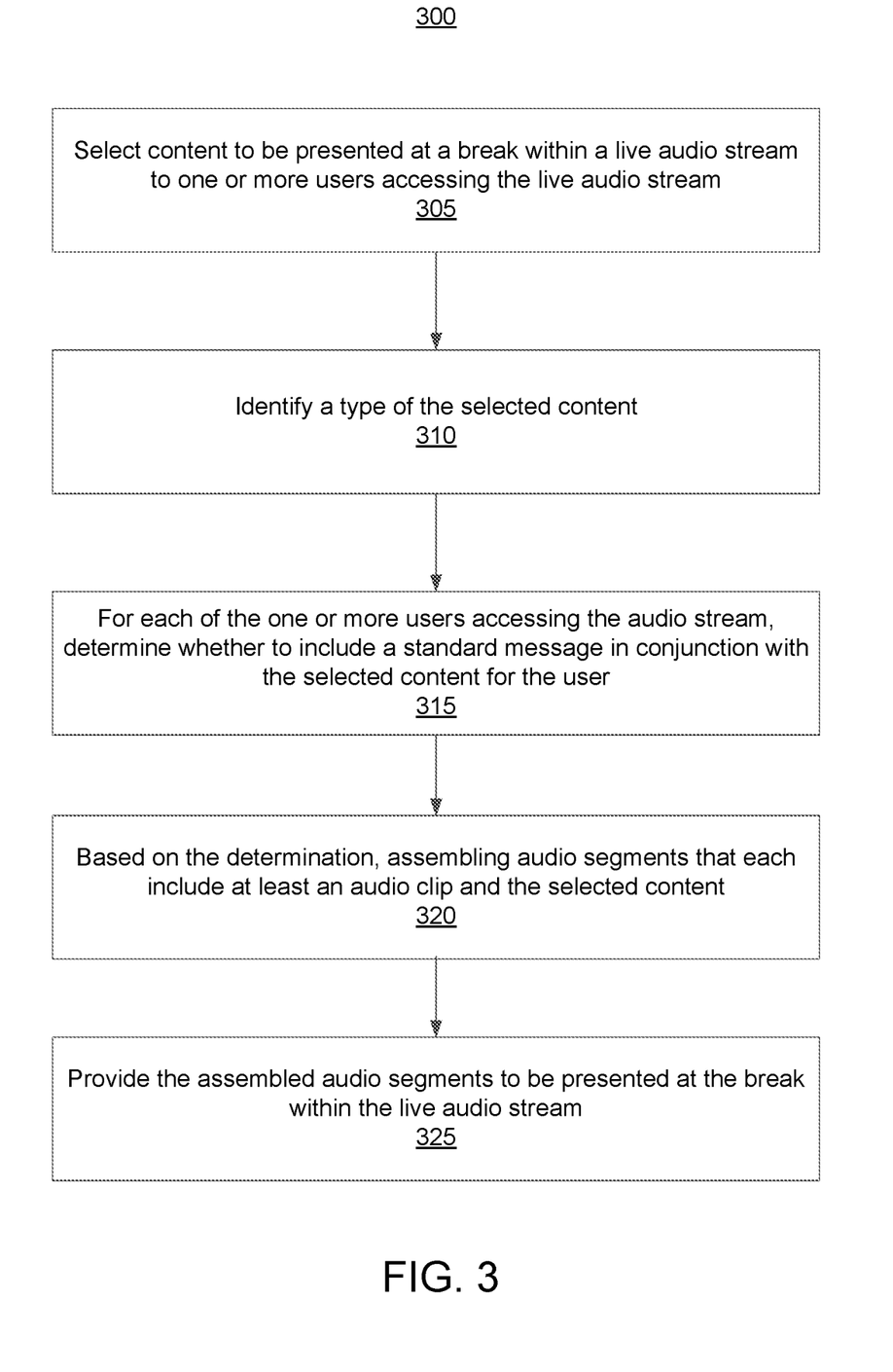
FIG. 3 illustrates an overall flow process for providing assembled audio segments within a live audio stream to users accessing the live audio stream, in accordance with an embodiment.

FIG. 3 illustrates an overall flow process for providing assembled audio segments within a live audio stream to users accessing the live audio stream, in accordance with an embodiment. The online system 150 selects 305 content to be provided to client devices 110 at a break within a live audio stream. The online system 150 further identifies 310 a type of the selected content. For example, the online system 150 identifies whether the selected content is an interactive content or a non-interactive content. The online system 150 determines 315 whether to include a standard message in conjunction with the selected interactive content for a user that is consuming the live audio stream. Generally, the online system 150 analyzes characteristics of each user to determine whether inclusion of the standard message, in addition to an audio clip, would be beneficial for introducing the user to the selected interactive content. Based on the determination at step 315, the online system 150 assembles 320 audio segments that each includes at least an audio clip and the selected content. In some of the assembled audio segments, the online system 150 may further include a standard message. The online system 150 provides 325 the assembled audio segments to be played at the break within the live audio stream.

Example Machine Architecture

Figure 4:
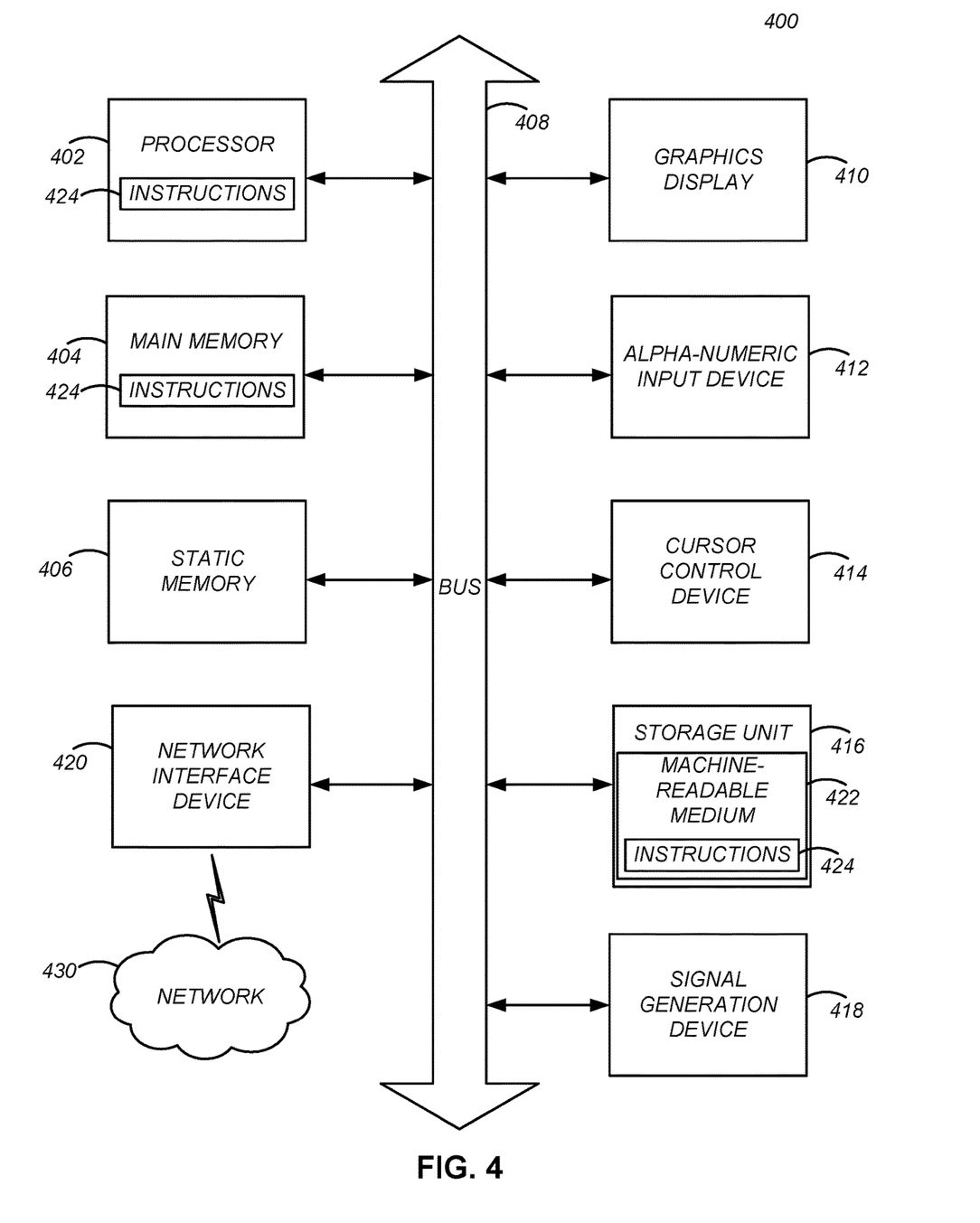
FIG. 4 is a block diagram illustrating components of an example machine able to read instructions from a machine-readable medium and execute them in a processor, in accordance with an embodiment.

FIG. 4 is a block diagram illustrating components of an example machine able to read instructions from a machine-readable medium and execute them in a processor, in accordance with an embodiment. Such an example machine, as shown in FIG. 4, can represent or be employed by the devices and/or systems as shown in FIG. 1. Specifically, FIG. 4 shows a diagrammatic representation of a machine in the example form of a computer system 400. The computer system 400 can be used to execute instructions 424 (e.g., program code or software) for causing the machine to perform any one or more of the methodologies (or processes) described herein. In other words, the processes described herein may be embodied as program code comprising instructions storable in the storage medium of the computer system and executable by the processor of the computer system 400. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 400 is used to execute the processes and functionality described in the figures. It is noted that the computer system 400 is exemplary and that not all the components described herein may be necessary to execute the processes as described above.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404 and the storage unit 416 communicate via a bus 408.

In addition, the computer system 400 can include a static memory 406, a graphics display 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 130 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Additional Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure. Embodiments of the disclosure enable improved user experiences as users are consuming live audio streams. By tailoring assembled audio segments for different users, the online system can ensure that users consuming the live stream are appropriately notified of upcoming content without compromising user listening experience. For example, new users that be notified with a standard message in addition to an audio clip whereas veteran users need not be provided the standard message and instead, can merely be presented the audio clip. This improves the overall likelihood that the user interacts with the interactive content that is presented within the live audio stream.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computer systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   determining that a type of a selected content selected to be presented at a break point within an audio stream to a user is an interactive type, the interactive type being determined based on audio within the selected content that is requesting one or more user actions to be taken with respect to a client device other than input supplied using a graphical user interface of the client device;
   responsive to determining that the type is the interactive type, determining an interaction score for the user, the interaction score being based on prior interactivity of the user with content of the interactive type that was previously presented to the user;
   assembling an audio segment, the audio segment including an additional message based on the interaction score being less than a threshold interaction value, and the audio segment excluding the additional message based on the interaction score being equal to or greater than the threshold interaction value; and
   providing the assembled audio segment to be presented at the break point within the audio stream.

2. The method of claim 1, wherein the assembled audio segment further comprises an audio clip in addition to the additional message.

3. The method of claim 2, wherein the audio clip in the assembled audio segment is shorter in duration in comparison to the additional message in the assembled audio segment.

4. The method of claim 2, wherein the additional message precedes the audio clip, and wherein the audio clip further precedes the selected content.

5. The method of claim 2, wherein the type of the selected content is an interactive content, and wherein the additional message identifies an interaction in association with the interactive content.

6. The method of claim 1, wherein determining whether to include the additional message with the selected content for the user comprises:
   determining whether characteristics of the user satisfy user interaction criteria; and
   responsive to determining that the characteristics of the user do not satisfy the user interaction criteria, including the additional message in the assembled audio segment.

7. The method of claim 1, wherein determining the interaction score for the user further comprises:
   accessing user characteristics of the user, the user characteristics comprising characteristics associated with prior voice recordings provided by the user; and
   applying a machine learning model to the user characteristics of the user.

8. The method of claim 1, further comprising:
   receiving a device identifier of a device used by the user; and
   determining the interaction type based on the device identifier of the device used by the user.

9. A non-transitory computer-readable medium comprising memory with instructions encoded thereon, the instructions, when executed, causing one or more processors to perform operations, the instructions comprising commands to:

determine that a type of a selected content selected to be presented at a break point within an audio stream to a user is an interactive type, the interactive type being determined based on audio within the selected content that is requesting one or more user actions to be taken with respect to a client device other than input supplied using a graphical user interface of the client device;

responsive to determining that the type is the interactive type, determine an interaction score for the user, the interaction score being based on prior interactivity of the user with content of the interactive type that was previously presented to the user;

assemble an audio segment, the audio segment including an additional message based on the interaction score being less than a threshold interaction value, and the audio segment excluding the additional message based on the interaction score being equal to or greater than the threshold interaction value; and     provide the assembled audio segment to be presented at the break point within the audio stream.

10. The non-transitory computer-readable medium of claim 9, wherein the assembled audio segment further comprises an audio clip in addition to the additional message.

11. The non-transitory computer-readable medium of claim 10, wherein the audio clip in the assembled audio segment is shorter in duration in comparison to the additional message in the assembled audio segment.

12. The non-transitory computer-readable medium of claim 10, wherein the additional message precedes the audio clip, and wherein the audio clip further precedes the selected content.

13. The non-transitory computer-readable medium of claim 10, wherein the type of the selected content is an interactive content, and wherein the additional message identifies an interaction in association with the interactive content.

14. The non-transitory computer-readable medium of claim 9, wherein the commands to determine whether to include the additional message with the selected content for the user comprise further commands to:

determine whether characteristics of the user satisfy user interaction criteria; and     responsive to determining that the characteristics of the user do not satisfy the user interaction criteria, include the additional message in the assembled audio segment.

15. The non-transitory computer-readable medium of claim 9, wherein the commands to determine the interaction score for the user further comprise further commands to:

access user characteristics of the user, the user characteristics comprising characteristics associated with prior voice recordings provided by the user; and     apply a machine learning model to the user characteristics of the user.

16. The non-transitory computer-readable medium of claim 9, wherein the instructions further comprise further commands to:

receive a device identifier of a device used by the user; and     determine the interaction type based on the device identifier of the device used by the user.

17. A system comprising:

memory with instructions encoded thereon; and one or more processors that, when executing the instructions, are caused to perform operations comprising:

determining that a type of a selected content selected to be presented at a break point within an audio stream to a user is an interactive type, the interactive type being determined based on audio within the selected content that is requesting one or more user actions to be taken with respect to a client device other than input supplied using a graphical user interface of the client device;

responsive to determining that the type is the interactive type, determining an interaction score for the user, the interaction score being based on prior interactivity of the user with content of the interactive type that was previously presented to the user;

assembling an audio segment, the audio segment including an additional message based on the interaction score being less than a threshold interaction value, and the audio segment excluding the additional message based on the interaction score being equal to or greater than the threshold interaction value; and     providing the assembled audio segment to be presented at the break point within the audio stream.

18. The system of claim 17, wherein the assembled audio segment further comprises an audio clip in addition to the additional message.

19. The system of claim 18, wherein the audio clip in the assembled audio segment is shorter in duration in comparison to the additional message in the assembled audio segment.

20. The system of claim 18, wherein the additional message precedes the audio clip, and wherein the audio clip further precedes the selected content.

\* \* \* \* \*